Dec. 3, 1957 E. SILVERMAN 2,815,441

TELEVISION WAVE TRAP AND THE LIKE

Filed Sept. 7, 1954

INVENTOR.
Emanuel Silverman
BY
Sidney A. Ochs
ATTORNEY.

United States Patent Office 2,815,441
Patented Dec. 3, 1957

2,815,441

TELEVISION WAVE TRAP AND THE LIKE

Emanuel Silverman, Oak Park, Mich.

Application September 7, 1954, Serial No. 454,314
16 Claims. (Cl. 250—20)

This invention relates to improvements in television wave traps for eliminating or controlling F. M., co-channel and adjacent channel interference in television receivers. The present application is a continuation-in-part of my co-pending application Serial No. 422,043 filed April 9, 1954.

In said co-pending application it was pointed out that in many television reception areas considerable difficulty is being presently encountered with adjacent channel interference which makes its appearance as a herringbone effect on the television receiver screen. It was also stated that in extreme cases, as where the interfering channel was close by while the channel which it is desired to receive is at a distance, interference from the adjacent channel usually results in complete obliteration of both picture and sound of the more distant channel which it is desired to receive and that similar obliteration results where the sound and/or picture of a lower channel interferes with an adjacent higher channel, the latter occurring for instance where the lower channel has picture and sound frequencies of 76 mc. and 80½ mc. respectively, and the higher channel has picture and sound frequencies of 82 mc. and 86½ mc. respectively.

I, there, also disclosed two distinct forms of electro-magnetically field coupled high Q tuned circuit forms of structures for attenuating the stated interference, one of these comprising a pair of electro-magnetically coupled (close inductive coupling) single loop inductances each adjustable by a variable capacitance to resonate over a band of frequencies and having means connecting these loops in parallel with the antenna transmission line which means is associated with one side only of each loop and the other form being of similar character to that above mentioned but differing in that the loop inductances are not only electro-magnetically coupled but are also capacitively coupled at the legs of the loops opposite those associated with the transmission line.

In my field work with wave traps of the foregoing types I have discovered that in those cases where the fringe area station has a weak signal that the interference created by the local station may best be attenuated by the first type of trap it being preferable in this instance to affect as close electro-magnetic coupling between the loops as is possible and to employ a loop length best suited for the frequency band encountered. On the other hand, I have found that if the fringe area station has a high band frequency the size of the loop used for best results may, even with close coupling be too small to give sufficient attenuation and in such cases it is found preferable to provide the additional capacitive effect aforesaid between the loop inductances such increasing the permissible attenuation at the antenna terminals by trapping a greater amount of signal. By making this added capacitance of a variable character a greater range of use may be provided for such a trap.

Accordingly, it is an object of the present invention to provide a variable wave trap for attenuating interference comprising a pair of loop inductances which are closely coupled and which have one end only of each loop associated with the antenna transmission line each with a different conductor and which loops have a length tailored to the band of frequencies where the interference exists.

Another object is to provide a wave trap comprising a pair of electro-magnetically coupled loop inductances which are also capacitively coupled to provide a greater range of attenuation.

Still another object is to provide a wave trap comprising a pair of electro-magnetically coupled loop inductances which are also capacitively coupled and which are particularly suited for high frequency band interference.

A specific object is to provide a wave trap comprising a pair of electro-magnetically or inductively coupled hairpin loops, each capacitively controlled and each having the end of one of its legs which legs are adjacent legs, connected in parallel with the antenna transmission line and having the ends of the other legs capacitively coupled.

A further object is to provide a trap of the type set forth in the preceding objects wherein the capacitive coupling is variable.

These and other objects of my invention will be apparent from the following description and from the drawing illustrating certain preferred embodiments of my invention.

In the drawing illustrating my invention:

Figures 1, 2, 3, 4, 5, 6, 7:
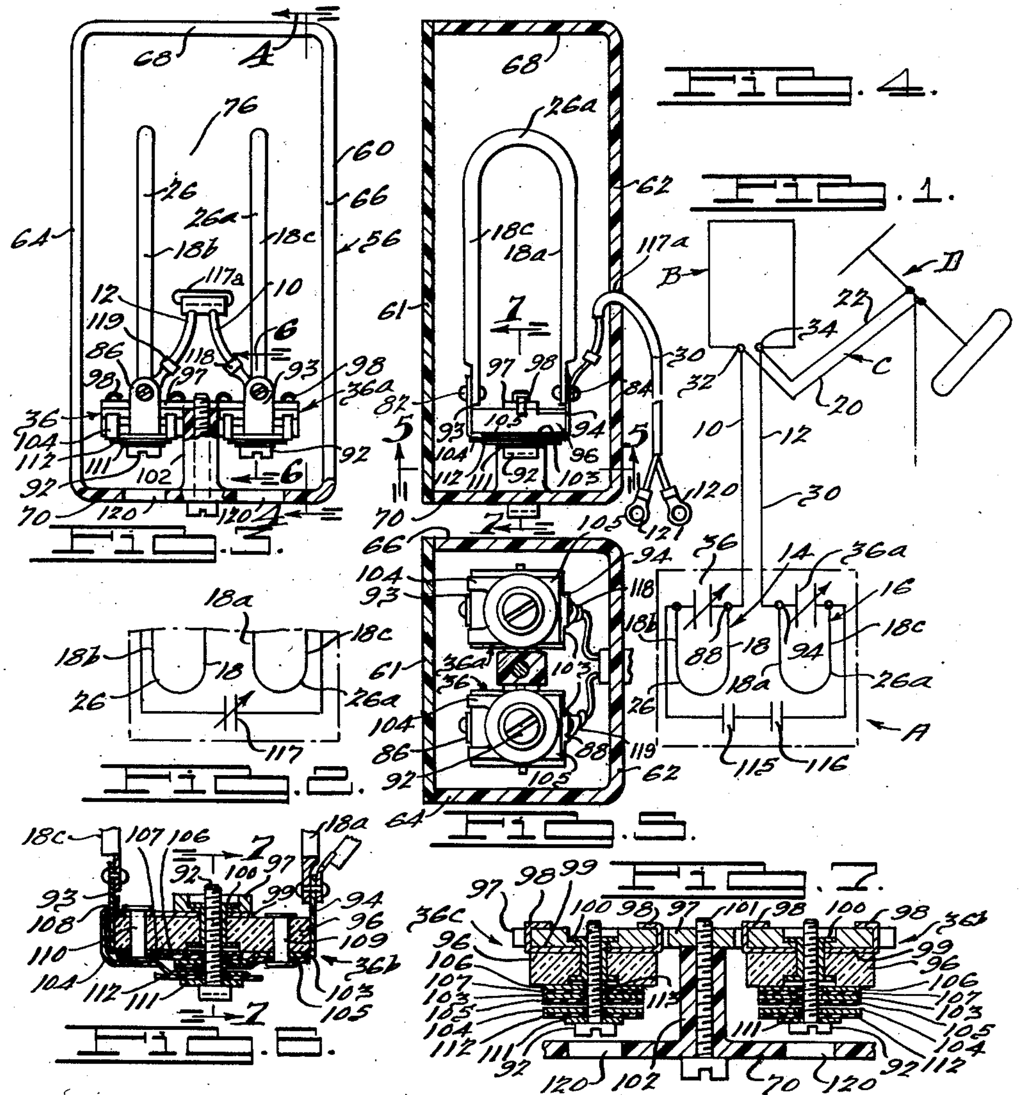
Figure 1 is a schematic view of one circuiting arrangement of my invention utilizing hairpin loops which are electro-magnetically and fixed capacitively coupled.
Figure 2 is a schematic view of the identical circuiting arrangement of Figure 1 (but shown only in part) wherein the capacitive coupling of the loops is a variable one.
Figure 3 is a front elevational view of a high dielectric housing mounting a wave trap of the form shown in Figure 1, the cover being omitted and parts being in section to show the mode of supporting the loops.
Figure 4 is a side elevational sectional view of the wave trap of Figure 3 taken on the line 4—4 of Figure 3.
Figure 5 is a bottom sectional view of the wave trap of Figure 4 taken on the line 5—5 of Figure 4 and showing the conductor connections with the loop inductances.
Figure 6 is a side elevational sectional view taken on the line 6—6 of Figure 3 through one of the loops and its variable capacitance but illustrating the latter to have a greater number of plates than the capacitance in Figure 3 and further showing the specific character of the capacitive control.
Figure 8:
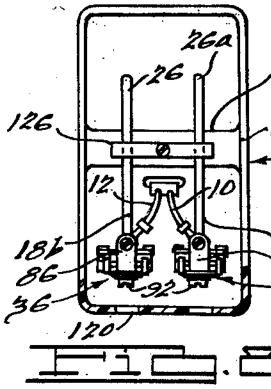
Figure 9:
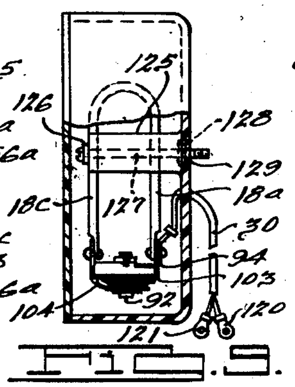
Figure 10:
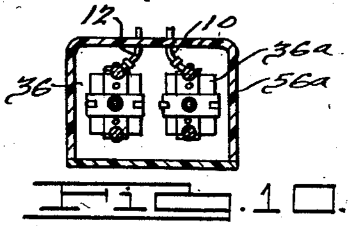

Figure 7 is a front elevational section of the trap of Figure 3 taken on the line 7—7 of Figure 4 and illustrating the structure for obtaining capacitive coupling between the loops but specifically using the variable capacitance of Figure 6; and Figures 8, 9 and 10 are views corresponding to those of Figures 3 to 5 respectively but of a modified form of wave trap wherein the hairpin loops are clamped to the enclosure and which modification omits the capacitive coupling of the Figure 3 arrangement between the loops but permits closer electro-magnetic coupling of the loop inductances.

Referring now to the drawings, Figures 1 to 4 inclusive illustrate a wave trap generally designated by the letter A, arranged for exterior mounting to a television receiver B and which includes conductors 10, 12 connecting it in parallel with the antenna transmission line C preferably at the antenna terminals of the television set B. The trap includes a pair of adjacent, electro-magnetically field or inductively coupled, high-Q tuned circuits generally referred to by the numerals 14 and 16, and connected by the independent conductors 10, 12 to the independent conductors 20, 22 respectively of the antenna transmission line C which line interconnects the antenna D and receiver B.

Each of high-Q circuits 14, 16 may comprise an inductance specifically a single loop inductance, for instance a hairpin or U-shaped loop inductance referred to by the numerals 26, 26a. Moreover, the connectors between the loops and the antenna transmission line C illustrated as conductors 10, 12, may together constitute a tuned lead circuit of predetermined wave length and may be a section 30 of conventional antenna transmission lead wire.

The tuned circuit length of the section 30 may, electrically speaking be in general approximately ¼ of a wave length of the interfering adjacent channel. However, in many instances dependent upon the character of the interference it will be found preferable to make this wave length less than ¼ wave length (i. e. a capacitance) and even quite short. In other cases the length may be greater than ¼ wave length (i. e. a lead inductance). The inductance value of each loop in the circuiting should be such as to substantially result in a high-Q resonant circuit.

A further important feature of my invention is the manner of connecting together the different elements of the wave trap and making connection thereof with the television receiver installation. Thus in order to obtain satisfactory results the end of one side or leg 18 only of the loop inductance 26 must be connected to the end of the conductor 10 of the tuned transmission lead section 30 and the end of one side or leg 18a of the other loop inductance 26a must be connected to the conductor 12 of the lead section 30 and the opposite ends of the conductors 10, 12 connected to the antenna transmission lead C by connecting the conductor 10 to one conductor 20 of the lead C and the conductor 12 to the conductor 22 of the lead C, these connections by preference being made at the terminals 32, 34 provided on the receiving set B and to which the transmission line C or lead in is connected.

It will be understood that the wave trap of my invention may be connected with the antenna circuit internally of the receiving unit if so desired.

In order to render my trap of universal application to different reception areas and to obtain the desired circuit resonance the loop inductances 26, 26a are provided across their open legs or ends with similar condensers or capacitors 36, 36a (36b, 36c Figures 6 and 7) which may be of the fixed type. Better still each loop inductance will be provided with means for adjusting the capacitance and/or inductance thereof to resonate over a band of frequencies. To this end the condensers 36, 36a may as seen in Figures 1 to 5 be in the form of variable mica trimmer capacitors (see Figure 6). In actual practice I have found that capacitors of about 10 to about 160 micromicrofarads are suitable for this purpose. Where such variable capacitors are employed the high-Q loops 26, 26a will be preferably physically cut such that the inductive reactance of each loop is equal to the capacitive reactance of the capacitors 36, 36a (or 36b, 36c) at the desired resonant frequency. As a guide to loop size, good results have been obtained with a hairpin type loop of about four inch overall height having its legs spaced about one inch apart and made from ⅛ inch diameter aluminum rod and having the two loops arranged in parallel with their corresponding legs equidistant from each other at a distance of about ¾ of an inch or less.

Figures 3 to 5 illustrate the preferred physical form of the high-Q field coupled tuned circuits 14, 16 and connectors 10, 12 of my invention employing capacitive coupling between the loops, and housed as shown in Figure 1 hereof in a dished casing 60 and cover 61 of substantially elongated rectangular form preferably made of a low loss synthetic resin plastic of the polystyrene or phenolic types. The casing has a back wall 62, side walls 64, 66 and end walls 68, 70 and the cover 61 is secured as by cementing to the casing.

Arranged interiorly of the housing 56 and spaced from the walls thereof are a pair of symmetrically positioned single loop inductances 26, 26a which are positioned in spaced apart face to face relationship so as to be separated by an air gap 76 and be electro-magnetically coupled. As seen, each loop comprises a generally U-shaped metallic rod for example of aluminum, shown here as inverted. Across the legs 18, 18b of the loop 26 is mounted by suitable screws or rivets 82, 84 the upstanding opposite terminal wings 86, 88 of a conventional two plate type trimmer capacitor or variable condenser 36, preferably 10 to 160 micromicrofarad capacity, and provided with an adjusting screw 92 operable for varying the capacitive effect of the capacitor between the limits thereof. A similar capacitor 36a is secured by its opposite upstanding terminal wings 93, 94 to the legs 18a and 18c of the loop inductance 26a.

The capacitors 36, 36a are mounted by their insulated bodies 96 to a metallic cross bar or plate 97 by suitable means such as metallic ears 98 associated with a metallic strip 99 (best seen in Figures 6 and 7) which is in metallic contact with or carries a threaded metallic bushing 100 in which the screw 92 may operate. The plate 97 is secured as by a screw 101 to a boss 102 of insulation material projecting inwardly from the wall 70 of the housing 56 centrally thereof and which may be an integral part of the casing. It will be observed that the loops 26, 26a are supported in a parallel upstanding relationship with their leg portions parallel to each other and equally spaced from each other, by the capacitors 36, 36a which in turn are supported by the plate 97 to the casing 60.

The capacitors or trimmer condensers 36, 36a each have a fixed nickel plate 103 and a movable spring nickel plate 104 insulated from each other by a mica sheet 105 which also separates them. The alternate capacitors 36b, 36c shown in Figures 6 and 7 have an additional fixed plate of nickel 106 below the fixed plate 103 and spaced from and insulated from it by a mica sheet 107 which also spaces it from the movable plate 104. The plates 104, 106 as seen in Figure 6 contact with each other at 108. The plate 103 and insulation 105 are secured to the porcelain base 96 by a rivet 109 and the plates 104, 106 and the mica layer 107 are secured to the base 96 by a rivet 110, care being taken that no connection is made by it between the metal plates.

The plate 104 is sprung to normally press against the head of the screw 92 through a large metallic washer 111 and a mica washer 112 which insulates the plate 104 from the screw 92 and washer 111. As the screw 92 is backed out of the bushing 100 the plate 104 moves away from the fixed plate 103 in Figure 4 and from the fixed plates 103, 106 in Figure 6 to increase the air gap there between and thus alter the value of the capacitor. Except for the washer 111 with which it is in direct contact the screw 92 passes through apertures 113 in all of the metallic plates of the capacitor which is of sufficient size that the screw shank does not contact these plates.

It will be observed that since the metal washer 111 of each capacitor 36, 36a is insulated from the capacitor plates 104 in Figure 4 and from plates 104, 106 in Figures 6 and 7, the washer 111 itself becomes part of a capacitance of fixed value created between it and the movable plate 104 of each capacitor 36, 36a in Figures 3 and 4 and between this washer or plate 111 and the plates 104, 106 in Figures 6 and 7. This capacitance is an important feature of my invention since it may be used to provide a greater range of attenuation of interference for the trap by coupling the two capacitances thus created in series across the loops 26, 26a. This is represented schematically in Figure 1 by the fixed capacitors 115, 116 corresponding to the capacitances created between the metal washers 111 and plates of condensers 36 and 36a and that created between the washers 111 and plates of capacitors 36b and 36c of the alternate construction in Figures 6 and 7. It is to be observed that the new result is obtained however only when the terminals 86, 93, respectively of the capacitors 36, 36a connect with the movable plates 104 thereof and with the legs 18b, 18c, respectively of the loops and the terminals 88, 94 respectively of these capacitors connect with the fixed plates 103 thereof and with the conductors 10, 12 respectively. The same is true if the capacitors of Figures 6 and 7 are used.

The two capacitors or capacitances created by the metal washers 111 are connected together in series through the adjustment screws 92 and metal mounting plate 97 and the opposite or plate 104 sides of these created capacitors are connected one to the leg 18b of one loop and the other to the leg 18c of the other loop, these legs being those opposite the legs to which the conductors 10, 12 are connected, which are the legs connecting with the terminals 88, 94 of the fixed plate of the capacitors 36, 36a. Unless the capacitors 36, 36a, or 36b, 36c are connected as above described in the circuiting the additional attenuation control will not be obtained.

A similar result where a variable control is desired and an additional independent capacitor may be employed, is obtainable as shown schematically in Figure 2 by connecting a variable capacitor 117 directly across the ends of legs 18b and 18c of the loops 26, 26a.

The rear wall of the housing 56 is provided with an aperture 117a through which is projected the above mentioned lead section 30 comprising the conductors 10, 12 for connecting the trap with the antenna transmission line C. Thus, one conductor 10 connects with the leg 18a of the loop 26a and the terminal 94 of the capacitor 36a by a terminal connector 118 held under the rivet 84 and the second conductor 12 is similarly connected with the corresponding leg 18 of the loop 26 and terminal 88 of the capacitor 36 by a terminal connector 119 held under a rivet 84 at the leg 18. The opposite ends of the conductors 10, 12 are provided with terminal connectors 120, 121 for connection with the terminals 32, 34 of the set B.

In using the unit of Figures 3 to 5 with the capacitance there shown or those in Figures 2, 6, and 7 the two terminals 120, 121 of the conductors 10, 12 respectively of the wave trap are attached for example and by preference to the antenna terminals 32, 34 on the television receiver B. The receiver B is then allowed to warm up for at least five minutes. Thereafter and with the housing 56 of the wave trap in hand the screws 92 of the trimmer capacitors 36, 36a are alternately adjusted about ⅛ turn at a time, through the openings 120 of the housing 56 and careful observation is made of any interference while turning either one of the screws.

After adjusting for minimum interference the housing 56 is mounted in any suitable manner to the rear of the television receiver, as far as possible from the chassis. The lead 30 should not be coiled but allowed to hang free. After mounting the housing 56 to the set a final adjustment of the wave trap for minimum interference is usually desirable.

It will be understood that a plurality of wave traps A may be used in the manner disclosed in my co-pending application aforesaid or a single trap and a secondary lead 30 be employed as there shown.

In Figures 8 to 10 I have shown a modification of the construction in Figures 1 to 7 and the circuiting for which is shown schematically in my prior co-pending application. Such construction omits the capacitive coupling between the loops 26, 26a of the Figures 1 to 7 construction. This modification gives excellent results in certain cases where for instance the fringe area station has a weak signal and the local station signal must be attenuated.

As seen in Figures 8 to 10 the loops 26, 26a are here held in a slotted cross bar 125 of the casing 60a of the housing 56a by a strap 126 of plastic material and low loss character which in turn is bolted to the cross bar by a screw 127 and nut 128, the latter being received in a pocket 129 of the casing 60a. If desired the screw 127 may project a substantial distance beyond the casing so as to provide a means for mounting the wave trap to the chassis of the receiver. The capacitors 36, 36a are mounted in any suitable manner across the ends of the loops, the supporting strap of the Figure 3 construction being here omitted.

In general, in using the form of trap shown in Figures 8 to 10 the loops 26, 26a will be brought together as close as possible for best results. If a further variable capacitor such as shown in Figure 2 is to be connected across the legs 18b, 18c of the loops in this construction then it is important that the movable plates 104 of the capacitors be preferably connected to the legs of the loops opposite those to which the conductors 10 and 12 are connected.

From the foregoing description of my invention it will be apparent that I have provided novel and efficient wave trap constructions that are effective in coping with interference conditions encountered in television receiving sets, especially co-channel and adjacent channel interference.

It will be understood that my wave traps are applicable to overcoming various forms of interference and hence various changes and modifications will suggest themselves to those skilled in the art without departing from the spirit and intent of the novel invention here disclosed. Accordingly, all such changes, modifications and equivalent structures coming within the scope of the appended claims are contemplated.

I claim:

1. An interference wave trap for a television receiving means having a receiving unit, an antenna, and a two wire transmission line between the receiving unit and antenna, said trap comprising a pair of high-Q tuned circuits, means associated with only one side of each of said circuits and connecting said one sides of said circuits in parallel with said two wire transmission line and means capacitively coupling the other sides of said circuits.

2. An interference wave trap for a television receiving means having a receiving unit, an antenna, and a transmission line between the receiving unit and antenna, said trap comprising a pair of high-Q tuned circuits, means associated with one side only of each of said circuits and connecting said circuits in parallel with said transmission line at the receiver unit end thereof, and means capacitively coupling the other sides of said circuits.

3. An interference wave trap for a television receiving means having a receiving unit, an antenna, and a transmission line between the receiving unit and antenna, said trap comprising a pair of high-Q tuned circuits including a plurality of capacitances providing capacitive coupling therebetween and a tuned line for connecting said circuits in parallel with said transmission line.

4. An interference wave trap for a television receiving means having a receiving unit, an antenna, and a transmission line between the receiving unit and antenna, said trap comprising a pair of high-Q tuned circuits, means for adjusting the frequency of said tuned circuits, means capacitively coupling one side only of each of said circuits, and means associated with the other side only of each of said circuits for connecting said circuits in parallel with said transmission line.

5. An interference wave trap for a television receiving means and the like comprising a pair of loop inductances, a capacitive control across the ends of each loop, a tuned line comprising a pair of conductors one connecting with an end of one loop and the other connecting with an end of the other loop, and a capacitive coupling between said loops at the ends thereof not connected with said tuned line.

6. An interference wave trap for a television receiving means having an antenna circuit, comprising a pair of electro-magnetically coupled loop inductances, a capacitive control across the ends of each loop, a pair of conductors for connecting said loops with the television antenna circuit, one conductor connecting with one end of one loop and the other connecting with one end of the other loop and a capacitance coupling said loops across the ends thereof not connected with said conductors.

7. An interference wave trap for a television receiving means and the like comprising a pair of U-loop inductances electro-magnetically associated, a tuned twin conductor lead connecting with said loops, one conductor connecting with one end of one of said loops, the other conductor connecting with one end of the other of said loops, a first variable capacitor connected across the ends of one loop, a second variable capacitor connected across the ends of the other loop, and a pair of series connected capacitances provided by said first and second capacitors coupled across the legs of said loops not connected with said conductors.

8. An interference wave trap for a television receiving circuit comprising a pair of U-loop inductances electro-magnetically associated, a pair of conductor leads connecting with said loops, one connecting with one end of one loop, the other connecting with one end of the other loop, a first capacitance comprising a pair of capacitively related plates connected across the ends of one loop, a second capacitance comprising a pair of capacitively related plates connected across the ends of the other loop, each of said capacitances including a third plate capacitively related with one of said pair of plates thereof, circuit means connecting said third plates, said one plate of said first capacitance being connected with the other end of said one loop from that to which said one conductor is connected and said one plate of said second capacitance being connected with the other end of the other loop from that to which said other conductor is connected.

9. An interference wave trap for a television circuiting comprising a pair of U-loop inductances electro-magnetically associated, a pair of conductor leads connecting with said loops, one connecting with one end of one loop, the other connecting with one end of the other loop, independent capacitances connected across the ends of each loop, and a further capacitance between the other ends of said loops from those to which said leads are connected.

10. An interference wave trap for a television receiving means comprising a pair of U-loop inductances electro-magnetically associated, a pair of conductor leads connecting with said loops, one connecting with one end of one loop, the other connecting with one end of the other loop, independent variable capacitances connected across the ends of each loop, and a pair of series connected capacitances between the other ends of said loops from those to which said leads are connected.

11. An interference wave trap as claimed in claim 10 wherein each of said series connected capacitances has a plate which is also a plate of one of said independent capacitances.

12. An interference wave trap for a television circuiting means comprising a pair of U-loop inductances closely electro-magnetically associated, independent capacitors connected across the ends of each loop, and a tuned lead consisting of a pair of conductors, one connected with one end only of one loop and the other connected with one end only of the other loop.

13. An interference wave trap for a television receiving means having a receiving unit, an antenna, and a transmission line between the receiving unit and antenna, said trap comprising a pair of U-loop inductances closely electro-magnetically associated, independent variable capacitors connected across the ends of each loop and means associated with one side only of each of said loops and connecting said loops in parallel with said transmission line.

14. An interference wave trap for a television receiving means comprising a pair of rigid U-loop inductances electro-magnetically associated and having their corresponding leg portions parallel with each other and substantially equally spaced from each other, a pair of variable trimmer condensers of between ½ to 150 micro-microfarad capacity, one connected across the ends of one loop, the other connected across the ends of the other loop, said condensers each having an adjustable plate, a screw for adjusting said plate, a metal washer under said screw in electrical association therewith and in capacitive association with said plate, and metallic means electrically connecting the said screws of said condensers and serving to support the latter and said loops, and a housing of high dielectric material enclosing said loops.

15. An interference wave trap for a television receiving means comprising a pair of rigid U-shaped metallic loop inductances closely electro-magnetically associated, a housing for enclosing said loops, a rib in said housing, a pair of parellel recesses in said rib for receiving and spacing said loops in parallel relationship, means clamping said loops with respect to said rib, and adjustable trimmer condenser across the ends of each loop, and a tuned lead consisting of a pair of conductors, one connecting with one end only of one loop and the other connecting with the corresponding end of the other loop.

16. An interference wave trap for a television receiving means comprising a pair of rigid U-shaped metallic loop inductances electro-magnetically associated, a housing for enclosing said loops, a pair of adjustable trimmer condensers, one connected across the ends of each loop, a metal strap connecting said condensers for supporting the same and said loops and for connecting in series a portion of the capacitative effect of said condensers, said condensers being positioned on said strap such that the corresponding legs of said loops are substantially parallel to each other and substantially equally spaced from each other, means mounting said strap to said housing, apertures in said housing through which to adjust said condensers and a tuned lead consisting of a pair of conductors one connected to one end of one loop and the other connected to the corresponding end of the other loop.

References Cited in the file of this patent

UNITED STATES PATENTS

| | | |
|---|---|---|
| 2,239,905 | Trevor | Apr. 29, 1941 |
| 2,513,761 | Tyson | July 4, 1950 |